(No Model.)  2 Sheets—Sheet 1.

P. STIENS.
ELECTRIC BATTERY.

No. 481,075. Patented Aug. 16, 1892.

Witnesses:
Thomas M. Smith.
Richard C. Maxwell.

Inventor:
Peter Stiens
By J. Walter Douglas
Att'y (No Model.)
P. STIENS.
ELECTRIC BATTERY.
No. 481,075. Patented Aug. 16, 1892.
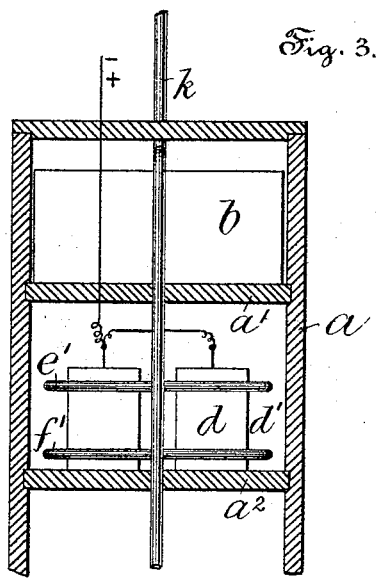
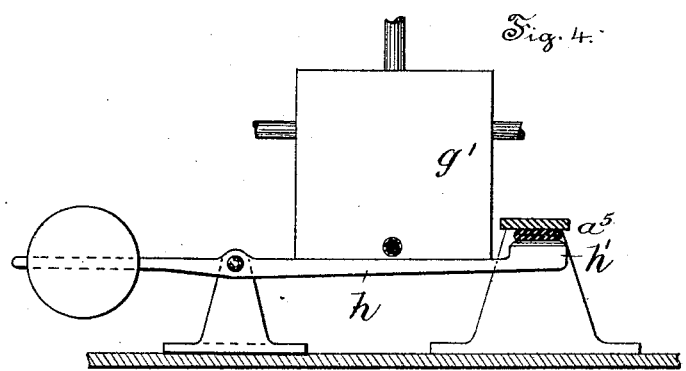
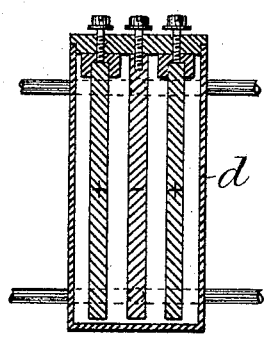
Witnesses:
Thomas M. Smith.
Richard C. Maxwell.
Inventor:
Peter Stiens.
By J. Walter Douglass.
Att'y.

UNITED STATES PATENT OFFICE.

PETER STIENS, OF CHARLOTTENBURG, GERMANY.

ELECTRIC BATTERY.

SPECIFICATION forming part of Letters Patent No. 481,075, dated August 16, 1892.

Application filed April 20, 1892. Serial No. 429,846. (No model.)

*To all whom it may concern:*

Be it known that I, PETER STIENS, a subject of the Emperor of Germany, residing at Charlottenburg, near Berlin, in the Kingdom of Prussia and German Empire, have invented certain new and useful Improvements in Electric Batteries, of which the following is a specification.

The principal objects of my present invention are, first, to provide simple, efficient, and comparatively inexpensive means for maintaining a constant flow or circulation of the electrolyte through a series of covered battery-jars, whereby the formation of so-called "climbing salts," due to crystallization of the electrolyte, is avoided; second, to provide for the escape of air and gaseous vapors from the battery-cells, whereby the polarization of the battery-plate is prevented; third, to provide a battery that may be advantageously employed in closed rooms without polluting the atmosphere thereof; fourth, to construct and arrange the parts of the battery in such manner that the same may be employed in moving trains or upon vessels without danger of the electrolyte being spilled, and, fifth, to provide a battery adapted to produce a current of constant strength for a considerable length of time without undue expenditure for maintenance and renewals.

My invention consists of the improvements in electric batteries hereinafter described and claimed.

The nature, scope, and characteristic features of the invention will be more fully understood from the following description, taken in connection with the accompanying drawings, forming part hereof, and in which—

Figure 1:
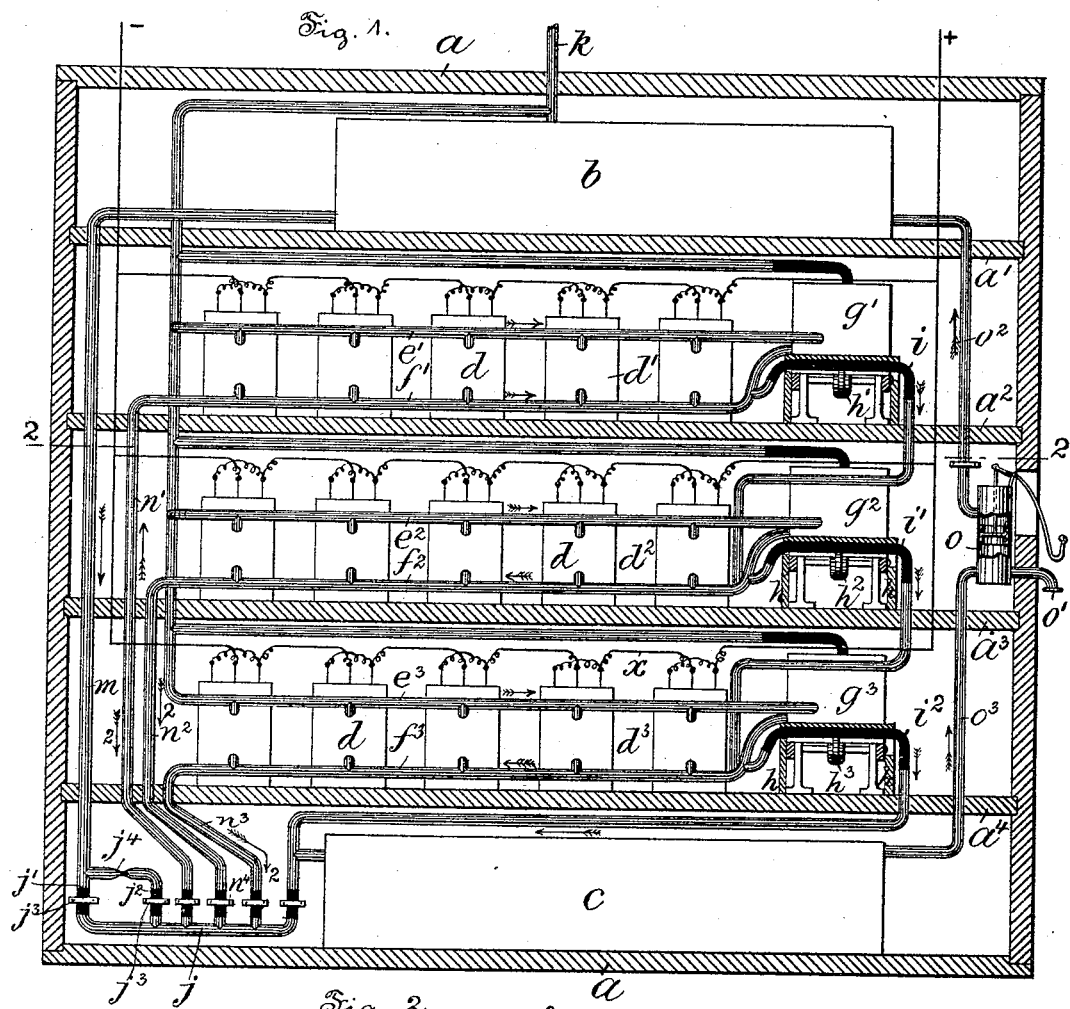
Figure 2:
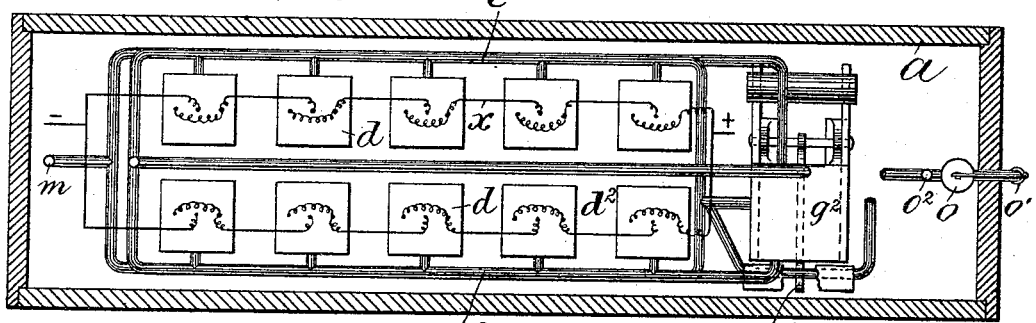

Figure 1 is a longitudinal vertical section of a battery embodying features of my invention, showing the jars or cells thereof arranged in three tiers or rows. Fig. 2 is a transverse section on the line 2 2 of Fig. 1. Fig. 3 is a vertical transverse section through the upper tier or row of jars or cells shown in Fig. 1. Fig. 4 is a detached view showing a counterbalanced pivotal arm and vessel for automatically controlling the flow or circulation of the electrolyte. Fig. 5 is a detail view showing a vertical transverse section through one of the jars or cells.

In the drawings, $a$ is a housing provided in the present instance with four shelves $a'$, $a^2$, $a^3$, and $a^4$.

$b$ is a covered or closed supply-tank supported upon the top shelf $a'$ and adapted to contain a supply of electrolyte.

$c$ is a closed or covered receiving-tank located at the bottom of the housing $a$ and adapted to receive the electrolyte after it has flowed through the battery cells or jars $d$. These jars or cells $d$, Fig. 5, are covered and are provided, preferably, with one negative and two positive plates or electrodes disposed as near to each other as possible. The jars are arranged in three series, rows, or tiers designated by the letters $d'$, $d^2$, and $d^3$, and these series are respectively supported upon the shelves $a^2$, $a^3$, and $a^4$. The jars of each series communicate near the top thereof with air-pipes $e'$, $e^2$, and $e^3$, respectively, and near the bottom thereof with supply-tubes $f'$, $f^2$, and $f^3$, respectively.

$g'$, $g^2$, and $g^3$ are series of closed regulating-vessels that are respectively supported upon counterbalanced pivotal arms $h'$, $h^2$, and $h^3$, and are located at higher levels than the respective series of jars to which they appertain. These vessels $g'$, $g^2$, and $g^3$ are respectively connected with the pipes $e'$, $e^2$, and $e^3$ and with the tubes $f'$, $f^2$, and $f^3$ by means of sections of rubber hose. The series of jars $d'$ is in communication with the series of jars $d^2$ by means of a connecting-tube $i$, that communicates with the supply-pipe $f'$ beneath the level of the vessel $g'$ and with the supply-pipe $f^2$. The series of jars $d^2$ is in communication with the series of jars $d^3$ by means of a connecting-tube $i'$, that communicates with the supply-pipe $f^2$ beneath the lever of the regulating-vessel $g$ and with the supply-pipe $f^3$, and the series of jars $d^3$ is in communication with the receiving-tank $c$ by means of a connecting-tube $i^2$, that communicates with the supply-pipe $f^3$ beneath the level of the regulating-vessel $g^3$ and with the feed-pipe $j$. The connecting-tubes $i$, $i'$, and $i^2$ are preferably made of rubber and are disposed, respectively, between the free ends of the counterbalanced arms $h'$, $h^2$, and $h^3$ and the under side of tables $a^5$, mounted upon the shelves $a'$, $a^2$, $a^3$, and $a^4$, so that when the regulating-vessels $g'$, $g^2$, and $g^3$ are empty the arms $h'$, $h^2$, and $h^3$ serve to compress and close the respective connecting-tubes, Fig. 4.

When the vessels are full, the free ends of the counterbalanced arms are depressed and the connecting-tubes are opened for the passage of fluid therethrough from one tier of jars to the next tier of jars in descending order. The air-pipes $e'$, $e^2$, and $e^3$ and also the supply-tank $b$ are in communication with an air-offtake $k$, that passes through the housing $a$ and discharges into the atmosphere. $m$ is a feed-pipe that leads from the supply-tank $b$ and communicates with the feed-pipe $j$ by means of two rubber tubes or branches $j'$ and $j^2$, whereof both are provided with pinch-cocks or clamps $j^3$, and whereof one $j^2$ is restricted in cross-section, as at $j^4$, so that a full supply of liquid is discharged from the feed-pipe $m$ into the feed-pipe $j$ when the tube or branch $j'$ is open, and a limited supply of liquid is discharged into the feed-pipe $m$ through the tube $j^2$ of restricted cross-section when the tube or branch $j'$ is closed by its clamp or pinch-cock.

$n'$, $n^2$, and $n^3$ are branch feed-tubes provided with pinch-cocks or clamps $n^4$ and communicating, respectively, with the feed-pipe $j'$ and with supply-pipes $f'$, $f^2$, and $f^3$.

$o$ is a force-pump provided with a discharge-outlet $o'$ and communicating with the supply-tank $b$ and with the receiving-tank $c$ by means of pipes $o^2$ and $o^3$.

$x$ are conductors for connecting up the battery-plates in any required manner.

When the battery is to be put into operation, the branch tube $j^2$, feed-pipe $j$, and branch feed-tubes $n^2$ and $n^3$ are closed by means of their complemental pinch-cocks, and a supply of electrolyte flowing from the supply-tank $b$ through the feed-pipe $m$, branch tube $j'$, and branch feed-pipe $n'$ is discharged into the series of cells or jars $d'$. These cells are thus gradually filled and the air and gaseous vapor escapes from them through the air-pipe $e'$ and is discharged into the atmosphere. A portion of the electrolyte also flows upward and is discharged into the regulating-vessel $g'$, it being understood that the connecting-tube $i$ is closed. As soon as the series of cells or jars $d'$ are filled the electrolyte flows from them into the regulating-vessel $g'$ through the air-pipe $e'$. The regulating-vessel $g'$ is thus filled and its increased weight, due to the liquid that it contains, causes the free end of the counterbalanced arm $h'$ to be shifted downward with the result that the connecting-tube $i$ is opened, thus permitting the electrolyte to overflow from the series of jars $d'$ through the connecting-pipe $i$ into the supply-tube $f^2$. The electrolyte from the supply-tube $f^2$ flows into the series of jars or cells $d^2$ and fills them. The overflow from this series of jars $d^2$ after passing through the regulating-vessel $g^2$ escapes through the connecting-tubes $i'$ into the supply-tube $f^3$. From the supply-tube $f^3$ the electrolyte passes into and fills the series of jars or cells $d^3$. The overflow from the series of jars $d^3$ after passing into the regulating-vessel $g^3$ flows through the pipe $i^2$ into the receiving-vessel $c$, from which it may be pumped through the pipes $o^3$ and $o^2$ by means of the pump $o$, and thus returned to the supply-tank $b$ for effecting the continued circulation of the electrolyte through the battery-jars. The direction in which the electrolyte normally traverses the respective tubes, pipes, jars, and their accessories is indicated by the arrows in Fig. 1. Whenever it becomes necessary or desirable to renew the electrolyte, the same may be pumped from the receiving-vessel $c$ through the pipe $o^3$ and then discharged through the offtake $o'$. The flow of the electrolyte through the cells or jars of the battery may be restricted by closing the branch tube $j'$ and opening the branch tube $j^2$, whose restricted cross-section decreases the flow of electrolyte from the supply-tank $b$. Owing to the constant rise and fall of the level of the liquid in the cells the electrolyte is kept in motion and the formation of crystals is prevented. Moreover, polarization of the elements is avoided by reason of the escape of the gases through the air-tubes into the atmosphere. Consequently the strength of the current generated by the battery is constant and uniform and the battery may be kept at work for a long time without decrease of efficiency.

All the cells of the battery may be rapidly emptied by closing the branch tubes $j'$ and $j^2$ and opening the branch feed-tubes $n'$ $n^2$ $n^3$ and the feed-tube $j$, so that the electrolyte flows from all the tiers of cells without passing through the regulating-vessels $g'$, $g^2$, and $g^3$ and is discharged into the receiving-tank $c$ in the manner indicated by the arrows 2 in the drawings.

Having thus described the nature and objects of my invention, what I claim as new, and desire to secure by Letters Patent, is—

1. The combination, in an electric battery, of one or more tiers of closed battery-cells, a supply-tank located above the battery-cells, a receiving-tank located beneath the battery-cells, a feed-pipe communicating with the supply-tank and with the upper tier of cells, air-pipes communicating with all the cells of the respective tiers and serving as overflow-pipes, connecting-tubes between the respective tiers of cells and the receiving-tank, counterbalanced arms normally closing said connecting-tubes, and regulating-vessels supported by said counterbalanced arms at a higher level than the respective tiers of jars with which they are in communication, substantially as and for the purposes set forth.

2. The combination, in an electric battery, of one or more tiers of closed battery-cells, a supply-tank located above the battery-cells, a receiving-tank located beneath the battery-cells, a force-pump and its complemental connections for emptying the contents of the receiving-tank into the supply-tank, a feed-pipe communicating with the supply-tank and with the upper tier of cells, air-pipes communicating with all the cells of the respective tiers and serving as overflow-pipes, connecting-tubes between the respective tiers of cells and the receiving-tank, counterbalanced arms normally closing said connecting-tubes, and regulating-vessels supported by said counterbalanced arms at a higher level than the respective tiers of jars with which they are in communication, substantially as and for the purposes set forth.

3. The combination, in an electric battery, of one or more tiers of closed battery-cells and their complemental regulating devices and overflow connections, an elevated supply-tank, a feed-pipe communicating with the supply-tank and the upper tier of cells and bifurcated to form branch tubes, whereof one is restricted in cross-section, and pinch-cocks or valves for opening and closing said branch tubes, substantially as and for the purposes set forth.

4. In an electric battery, a tier of closed battery-cells, a pipe for supplying electrolyte thereto, a connecting or overflow tube, a counterbalanced pivotal arm normally closing said connecting-tube, a covered regulating-vessel supported by said arm at a higher level than the cells, and tubes communicating with said cells and regulating-vessel, substantially as and for the purposes set forth.

5. The combination, in an electric battery, of one or more tiers of closed cells and their complemental filling and discharging apparatus and a series of air-tubes discharging into the atmosphere and communicating with said cells and with the tanks and vessels of the filling and discharging apparatus, substantially as and for the purposes set forth.

In witness whereof I have hereunto set my hand in presence of two witnesses.

PETER STIENS.

Witnesses:
PAUL FISCHER,
REINHOLD HUNDRILSER.